(12) United States Patent
Altuev

(10) Patent No.: US 11,488,126 B2
(45) Date of Patent: Nov. 1, 2022

(54) CASHIER FRAUD DETECTING SYSTEM AND METHOD AND PRODUCT IMAGE SELECTION GENERATION FOR ARTIFICIAL NEURAL NETWORK LEARNING RELATED APPLICATIONS

(71) Applicant: OOO ITV Group, Moscow (RU)

(72) Inventor: Murat K. Altuev, Moscow (RU)

( * ) Notice: Subject to any disclaimer, the term of this patent is extended or adjusted under 35 U.S.C. 154(b) by 15 days.

(21) Appl. No.: 16/386,253

(22) Filed: Apr. 16, 2019

(65) Prior Publication Data

US 2020/0019947 A1 Jan. 16, 2020

(30) Foreign Application Priority Data

Jul. 11, 2018 (RU) .............................. RU2018125450

(51) Int. Cl.
*G06Q 20/20* (2012.01)
*G06Q 20/40* (2012.01)
*G07G 1/00* (2006.01)

(52) U.S. Cl.
CPC ......... *G06Q 20/20* (2013.01); *G06Q 20/4016* (2013.01); *G07G 1/0009* (2013.01); *G07G 1/0045* (2013.01)

(58) Field of Classification Search
CPC .......... G06Q 30/00; G06K 9/68; G06K 15/00; H04N 7/18
USPC .................................... 235/383, 379; 705/22
See application file for complete search history.

(56) References Cited

U.S. PATENT DOCUMENTS

| | | | |
|---|---|---|---|
| 10,013,633 B1* | 7/2018 | Manmatha | G06F 16/583 |
| 2006/0243798 A1* | 11/2006 | Kundu | G06Q 20/4016 |
| | | | 235/383 |
| 2010/0217678 A1* | 8/2010 | Goncalves | G07G 1/0063 |
| | | | 382/209 |

(Continued)

FOREIGN PATENT DOCUMENTS

| | | |
|---|---|---|
| RU | 2477522 C2 | 3/2013 |
| RU | 127970 U1 | 5/2013 |
| WO | 2010096699 A2 | 8/2010 |

*Primary Examiner* — Olusegun Goyea
(74) *Attorney, Agent, or Firm* — Georgi Korobanov

(57) ABSTRACT

A group of inventions relates to artificial neural networks and their application for computer vision, in particular for the surveillance camera data processing systems and methods to automatically detect cashier fraud by verifying images using artificial neural networks. To detect cashier fraud, a POS system includes a barcode reader, memory, an image capture device, and a data processing module. The data processing module is configured to receive the data about the scanned product from the product database and to receive the video data from the image capture device. An automatic generation of product image set for artificial neural network learning contains stages when the barcode is read by placing an item against a barcode reader by a cashier, the barcode data signal then provides the data about the scanned product from product database, when the barcode data signal gives the image of the placed product from the image capture device, the received image of the placed item is saved with the data about the scanned product in the product database, then the abovementioned stages are repeated for each item placed against the barcode reader.

20 Claims, 2 Drawing Sheets

(56) References Cited

U.S. PATENT DOCUMENTS

2015/0213315 A1* 7/2015 Gross .................... G06T 7/0004
382/159
2017/0251183 A1* 8/2017 Crooks .................. G06V 20/52

* cited by examiner

CASHIER FRAUD DETECTING SYSTEM AND METHOD AND PRODUCT IMAGE SELECTION GENERATION FOR ARTIFICIAL NEURAL NETWORK LEARNING RELATED APPLICATIONS

RELATED APPLICATIONS

This application claims priority to Russian Patent Application No. RU 2018125450, filed Jul. 11, 2018, which is incorporated herein by reference in its entirety.

FIELD OF THE INVENTION

The present group of inventions pertains to artificial neural networks used for computer vision, in particular, to processing systems and methods for video data obtained from surveillance cameras, for automatic detection of cashier fraud by analyzing the images using artificial neural networks.

BACKGROUND

Point of sale systems are software and hardware solutions for selling merchandise and services in both cash and cashless modes. The merchandise must be recorded, and this information must be recorded in a store system and displayed on the receipt, while the store (point of sale, POS) must receive the sum of money shown in the receipt.

However, very often the transaction processing at the checkout leads to a number of fraud schemes both by the customers and cashiers. For example, a cashier could deliberately scan a barcode of a cheaper item and give a more expensive item to their accomplice. Such fraud schemes usually require a collusion between the cashier and the customer.

Technical measures against this fraud at the checkouts are grounded on the analysis algorithms for the transactions in POS, as well as on the data from the surveillance systems.

Surveillance systems are software and hardware systems using computer vision for automatic data collection based on analysis of streaming video (video analysis). Surveillance systems use image processing and image recognition or verification algorithms to analyze the video with no direct user participation.

The standard video surveillance methods are suitable for analysis of any events at the checkout and responses to the complaints from the customers. However, they are rather labor consuming and very often inefficient due to poor accuracy to carry out a consistent analysis of the cashier's actions and to analyze the reasons for a huge number of suspicious transactions from a POS terminal by looking through all actions at the checkout. Hence, preventing the thefts and detecting frauds need mode advanced systems, which could automatically analyze the video data from the surveillance cameras and to compare these data with the product information from the cashier's database.

Presently, artificial neural networks are widely used for verifying and to recognizing images. These methods are especially popular for person verification.

An artificial neural network (ANN) is a mathematical model, as well as its hardware and/or software embodiments, based on the principle of organization and functioning of the biological neural networks (nerve cell networks in living organisms). One of the main ANN advantages is its learnability when ANN could identify complex dependencies between the input data and output data on its own.

However, there is an obstacle in applying ANNs in POS systems—image selection for ANN learning. This image collection must contain tens of thousands of product images with the information about the product in the picture. Besides, the product selection in every shop could significantly differ and change with time; therefore, the image selection should be constantly updated. This work, if done manually, is extremely labor consuming. Therefore, ANN application in the POS systems requires being able to automatically select the learning images, for example, from the information provided by the POS system itself.

One solution is disclosed in the US Patent Application No. US 2010/0217678 A1 published Aug. 26, 2010, which describes product checking system connected with a POS system and a barcode reader. This product checking system contains one or several images for detecting object images and a data repository configured to store entries for multiple elements, where each entry contains a visual model of one of a multitude of elements and a universal identifier of an element (UPC); while the visual model contains: (a) at least one image of the element; and (b) one or several geometric pixel images derived from one or several images of the element; where a system processor is configured to compare the object image with a visual model of at least one of the elements; to recognize the object from the set of elements based on the object image; and to automatically add the obtained image into the data repository if the object image does not match a visual model of any of the elements.

The main disadvantage of this solution is that an image placed against the barcode reader is compared with the visual models of all previously stored elements. However, a huge number of goods and their visual models increase the computational complexity of this comparison and significantly decrease its accuracy. Besides, this solution does not use artificial neural networks during the image comparison, which also decreases the accuracy of the obtained result. This solution is chosen as a prototype.

BRIEF SUMMARY

The disclosed group of technical solutions is aimed to overcome the disadvantages typical for the previous art and to improve already known solutions.

The technical result of the disclosed group of inventions is an increase of the accuracy in detecting the cashier fraud.

This technical result is achieved by the fact that a cashier's fraud detecting POS system includes a barcode reader; memory configured to store the product database with the product image selection; an image capture device configured to receive the video data from a cashier scanned barcode area; and at least one data processing module configured to receive the data about the scanned goods from the product database on the basis of the barcode data signal from the barcode reader; to receive the video data from the image capture device and to verify with an artificial neural network, and this verification means to compare the product image received from the image capture device at the moment of receiving the barcode data signal and at least one product image in the data about this scanned product; if the verification result is negative, then at least one data processing module detects the cashier fraud.

In some embodiments, the mentioned POS system is additionally configured to automatically generate and update the product image selection for artificial neural network learning, and this selection contains sets of product images.

In some embodiments, the products in the product database are divided into the product classes.

In some embodiments, each product or each class of products has its own artificial neural network used for verification.

In some embodiments, data about each product includes the name of the product, its value, its barcode, a selection of product images.

In some embodiments, the verification runs in a real time mode.

In some embodiments, the detection of the cashier fraud requires sending a notification of a pre-set particular user.

In some embodiments, verification runs through the archive data obtained from the barcode reader and the image capture device stored in the memory.

In some embodiments, archive data verification automatically generates a report with all detected facts of a cashier fraud.

The specified technical result is also achieved by the fact that the method of automatic selection of the product images for artificial neural network learning done by a POS system with at least one data processing module contains the stages when (a) the barcode is read by placing a product against the barcode reader by a cashier, and the barcode data signal is developed; (b) the barcode data signal gives the data about the scanned product stored in the POS system memory, and if this database does not contain the data about the scanned product, then a new entry about this product is created; (c) the moment of receiving the barcode data signal gives the image of the placed product to the image capture device configured to receive the video data from the barcode reading area; (d) the received image of the placed product is stored with the data about the scanned product in the product database; (e) the abovementioned stages (a)-(d) are repeated for each product placed against the barcode reader, then the product images are automatically selected or updated to teach an artificial neural network used to detect the cashier fraud.

In some embodiments, an artificial neural network learns from the updated database of products.

In some embodiments, product images are selected or updated, and an artificial neural network learns, which are continuous processes, because a set of products and their appearance change in time.

In some embodiments, the data processing module selects or updates the product images, teaches an artificial neural network and detects the cashier fraud in parallel.

In some embodiments, an artificial neural network learns gradually at a particular time set by a user.

In some embodiments, POS system data processing module or a POS system cloud service teaches an artificial neural network.

In some embodiments, the received image of the placed product is stored with the data about the scanned product in the product database, even if the specified product data contain at least one image.

In some embodiments, data about each product includes the name of the product, its value, its barcode, product image selection.

In some embodiments, the product image selection contains N latest uploaded images for this product where N is a positive integer pre-set by a user.

In some embodiments, if the product value is less than the pre-set threshold, then the image received from the image capture device is not added to the product image selection.

In some embodiments, the products in the product database are divided into the product classes.

In some embodiments, each product or a class of products has its own artificial neural network used to verify the cashier fraud.

Besides, the specified technical result is achieved by the fact that the method of detecting the cashier fraud is embodied by a POS system with at least one data processing module and contains the stages when a cashier places a product against the barcode reader and the barcode is read, and the barcode data signal is generated; the barcode data signal gives the data about the scanned product from the product database, and the specified product database contains a constantly updated product image selection; the video data is received from the image capture device, and they are verified by an artificial neural network taught by the updated product database; and the specified verification presupposes the comparison of the product image from the image capture device at the moment of receiving the barcode data signal and at least one product image from the data about the scanned product; if the verification result is negative, then one data processing module detects the cashier fraud.

In some embodiments, the abovementioned method is additionally embodied with a possibility of automatic selection or the update of the product images to teach an artificial neural network, and the abovementioned selection contains sets of the product images.

In some embodiments, the data processing module selects or updates the product images, teaches an artificial neural network and detects the cashier fraud in parallel.

In some embodiments, the products in the product database are divided into the product classes.

In some embodiments, each product or each class of products has its own artificial neural network used for verification.

In some embodiments, the data about each product include the name of the product, its value, its barcode, product image selection.

In some embodiments, the product image selection contains N latest uploaded images for this product, where N is a positive integer pre-set by a user.

In some embodiments, if the value of the product is less than the pre-set threshold, then this product is not verified.

In some embodiments, verification runs in a real time mode.

In some embodiments, a notification is sent to a pre-set particular user if the cashier fraud is detected.

In some embodiments, the archive data from the barcode reader and the image capture device stored in the memory are verified.

In some embodiments, verification of the archive data automatically generates a report with all the detected facts of a cashier fraud.

Besides the abovementioned examples, this technical result may also be achieved by a computer-read data medium with CPU executed instructions to embody the alternatives for detecting the cashier fraud, as well as by a computer-read data medium with CPU executed instructions to embody the methods of automatic selection of product images to teach an artificial neural network.

DETAILED DESCRIPTION

Possible embodiments for the inventions are described below. However, the group of inventions is not limited to these embodiments. It is apparent to those skilled in the art that the inventions include other embodiments.

The technical solution in its various embodiments may be implemented as POS systems and methods implemented by various computational devices, as well as a computer-read data medium storing CPU-executed instructions.

Figure 1:
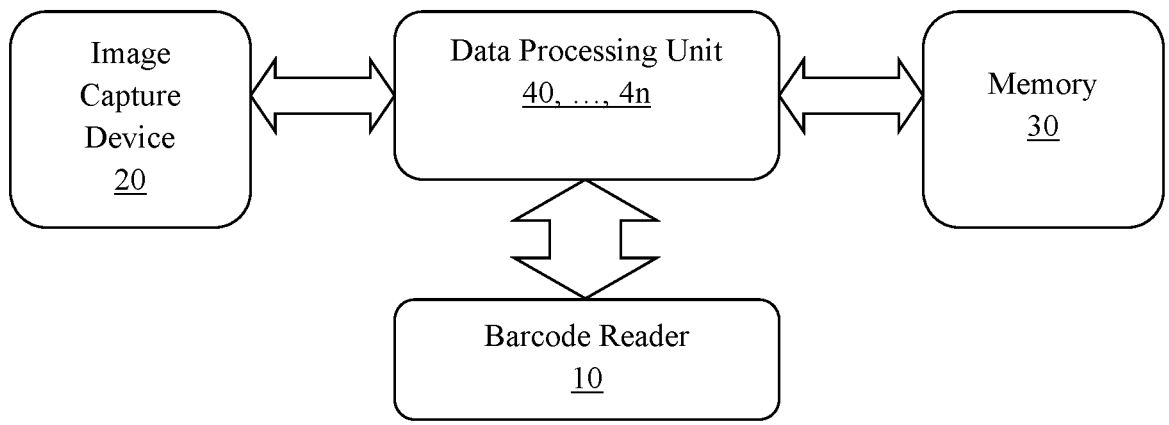
FIG. 1 is a flow chart of a computer system detecting cashier fraud.

FIG. 1 gives a flow chart of a POS system for detecting—cashier fraud. The POS system includes a barcode reader (10), an image capture device (20), memory (30), and at least one data processing module (40, . . . , 4n).

In this context, POS systems may be any computational systems based on interconnected hardware and software.

A barcode reader may be a scanner of any manufacturer (of any type, for example, LED, laser, image scanner). A barcode is graphic information printed on the surface or the package of a product with the possibility to read it with devices, for example, scanners. In some embodiments the barcode may be a QR-code which is recently quite popular in trade.

In this application, an image capture device may be a video camera.

A data processing module may be a CPU, microprocessor, computer, PLC (programmable logic controller), or an integrated circuit configured to execute data processing commands (instructions, applications, etc.).

A memory device configured to store data may be, without limitation, a hard disk drive (HDD), flash drive, ROM (read-only memory), solid-state drive (SSD), optical drives, etc.

The computer system may include other compatible devices, for example, sensors, input and output devices, display devices, etc.

An example of how the abovementioned POS system works to detect cashier fraud is provided below. The same principles may also be applied to the disclosed method of detecting a cashier fraud.

Considering the operating principles of POS system embodiments in a real time mode, suppose that a customer with an item comes to the cashier at the checkout to buy the product.

An image capture device, a video camera in our case, is positioned to receive video data from the cashier's barcode scanning area with no interruptions. The POS system may also include other surveillance cameras to control other zones in the checkout area, for example, in the area where cashier accepts the items from the customer or in the zone where the purchased items are picked up.

When a cashier places a product against the barcode reader, the barcode reader generates a barcode data signal, which prompts the data processing module to retrieve the data for the scanned product barcode from the product database.

The data about each product stored in the product database may include, but not limited to, the name of the product, its price, its barcode, product images, etc. The products in the product database may be subdivided into product classes. Examples of these classes may be, without limitation, box, bundle, glass bottle, plastic bottle, etc.

The data processing module receives the video from the image capture device and identifies the image of the scanned item placed against the barcode reader. Then the data processing module verifies the image using an artificial neural network.

The verification includes comparison of the item's image received from the image capture device at the time of receiving the barcode data signal and at least one product image from the product image data stored for the scanned product barcode.

If the verification result is positive, that is, the item image received from the image capture device sufficiently matches at least one of the images for the scanned product barcode, then the product registration is considered successful. If the image of the scanned item matches at least one image from the images for the scanned product barcode, then the system stops the verification process, even if the images include images which have not been compared with the scanned item image. This saves the available resources of the system and speeds up the comparison.

If the verification result is negative, then at least one data processing module detects the cashier fraud.

In some POS system embodiments, this verification may be done both for the product data and for the product data class related to the scanned product barcode.

Before the item image is transmitted to the artificial neural network during verification and during the learning process of the artificial neutral network, the image may be preprocessed for, for example, finding the borders of the item, scaling the item image, and by transforming the color characteristics of the item image.

Then the artificial neural network identifies the key features of the item image. The result is a set of numbers called image descriptors. Verification compares the image descriptors of the scanned item and of the images for the scanned product barcode using, for example, Euclidean distance. In the context of the example, if the Euclidean distance is less than a pre-set value, then the data processing module determines using the ANN that the image of the scanned product matches the image from the product database. If the Euclidean distance exceeds the pre-set value, then the data processing module continues to compare the image descriptors of the scanned item and of the next product image. If all available images for a product do not sufficiently match the image of the scanned item received from the image capture device, the data processing module detects the cashier fraud.

Additionally, this POS system is configured so that once cashier fraud is detected in a real time mode, a notification to a pre-set user of the system, for example, to a security service employee, is sent. The notification to the user could be sent via an SMS, MMS, or an email. This configuration helps the users to respond promptly to the detection of the fraud, to arrest the wrongdoers, and to hold them responsible.

The disclosed POS system for detecting the fraud is more accurate in comparison with the known equipment because the comparison is made only of the scanned item image and the data for the scanned product, rather than the data for the entire product database. The advantages of this solution include a high rate of image processing and higher accuracy in detecting cashier fraud.

This computer system is described above in the real time mode, although it can also be used for the verification of archived data by the artificial neural network. In such embodiment, the data from the barcode reader and the image capture device automatically get stored in the memory of the POS system. Thus, a security service employee with the access to the data may look through them and launch the verification at the data processing module at any convenient time. For example, to save the resources of the data processing module, a security service employee may run the verification once a day or once a week. This verification takes less time and is more efficient when cases of fraud are rare.

The result of this verification to detect cashier fraud may be prepared as an automatically generated report at the display module or stored in the computer system memory or in the security system database. This report includes all detected facts of cashier fraud.

Additionally, the mentioned POS system is configured so that the plurality of product images is generated automatically or updated to teach the artificial neural network.

At least one data processing module may generate or update the product images, teach an artificial neural network, and detect cashier fraud in parallel. Once the data processing module receives an image of the scanned item, this image is used in parallel for verification and for generation or updating the product images. And if this image is added to the product images before the verification runs to the end, then, for this case, the data processing module is configured so that the image of the scanned item is not compared with the just added new product image.

In some embodiments, a POS system contains a separate artificial neural network used for verification of each class of products or even for each product.

Additionally, to update the data in the POS system, the image selection may contain only N latest uploaded product images for each product, where N is a user preset positive integer.

If the information about a fraud concerning cheap items is not very important for the store in comparison with the information about more expensive goods, then the system may be configured to analyze the price of the scanned item before the verification process. If the price in the product data is below a preset threshold (for example, less than $10, or $100, or $500, etc.), then this product will not be verified. The user of the POS system can set this threshold and change it in particular situations.

Figure 2:
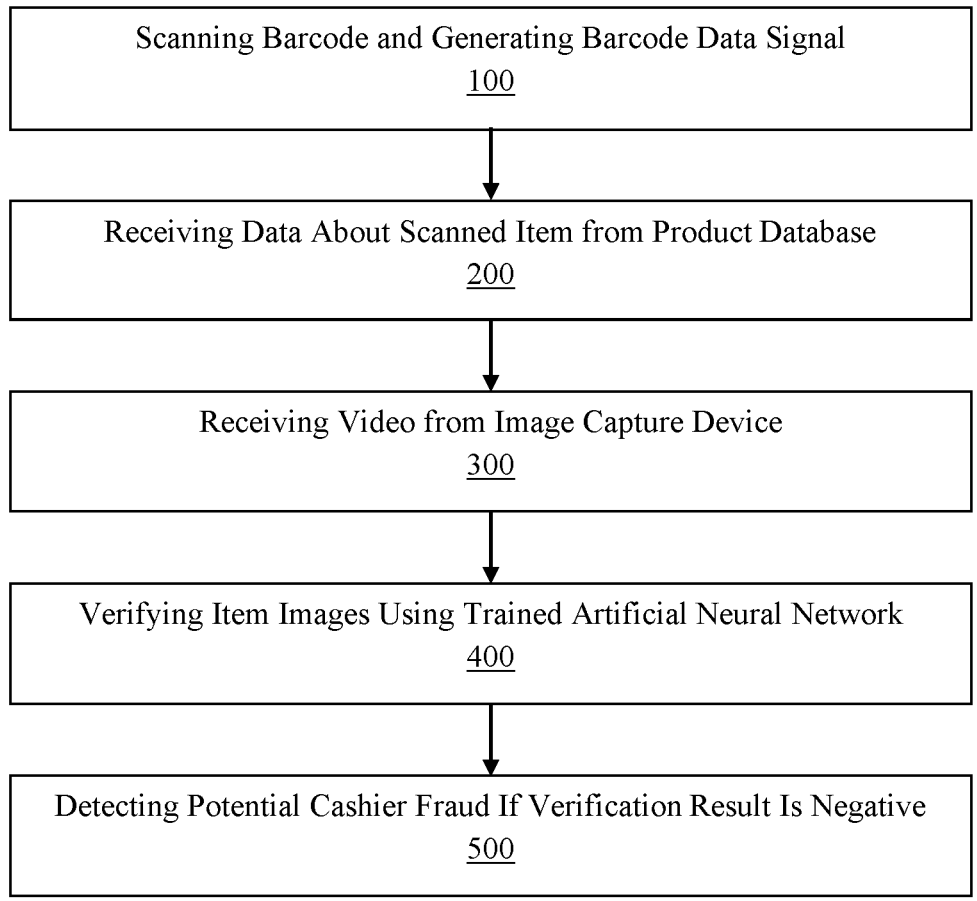
FIG. 2 is a flow chart of a method for detection of cashier fraud.

An example of a particular embodiment for the method of detecting the cashier fraud is shown in FIG. 2 as a flow-chart of one of the embodiments of the method of detecting cashier fraud.

This method is embodied in a POS system with at least one data processing module. The method contains the stages when (100) once a cashier places an item against a barcode reader, a barcode is scanned, and a barcode data signal is generated;

(200) the barcode data signal helps get the data about the scanned product from the product database, which database contains a continuously updated product image selection;

(300) video data is received from an image capture device; and (400) verification is run using the artificial neural network taught by the updated product database, where the verification means the comparison of an item image from the image capture device with at least one product image from the data about the scanned product;

(500) if the verification result is negative, then at least one data processing module detects the cashier fraud.

This method may be implemented by the POS system disclosed above and may be extended and enhanced by all alternative elements disclosed for POS systems detecting cashier fraud.

One method of forming set of images for teaching an artificial neural network used for verification to detect cashier fraud is disclosed below.

Figure 3:
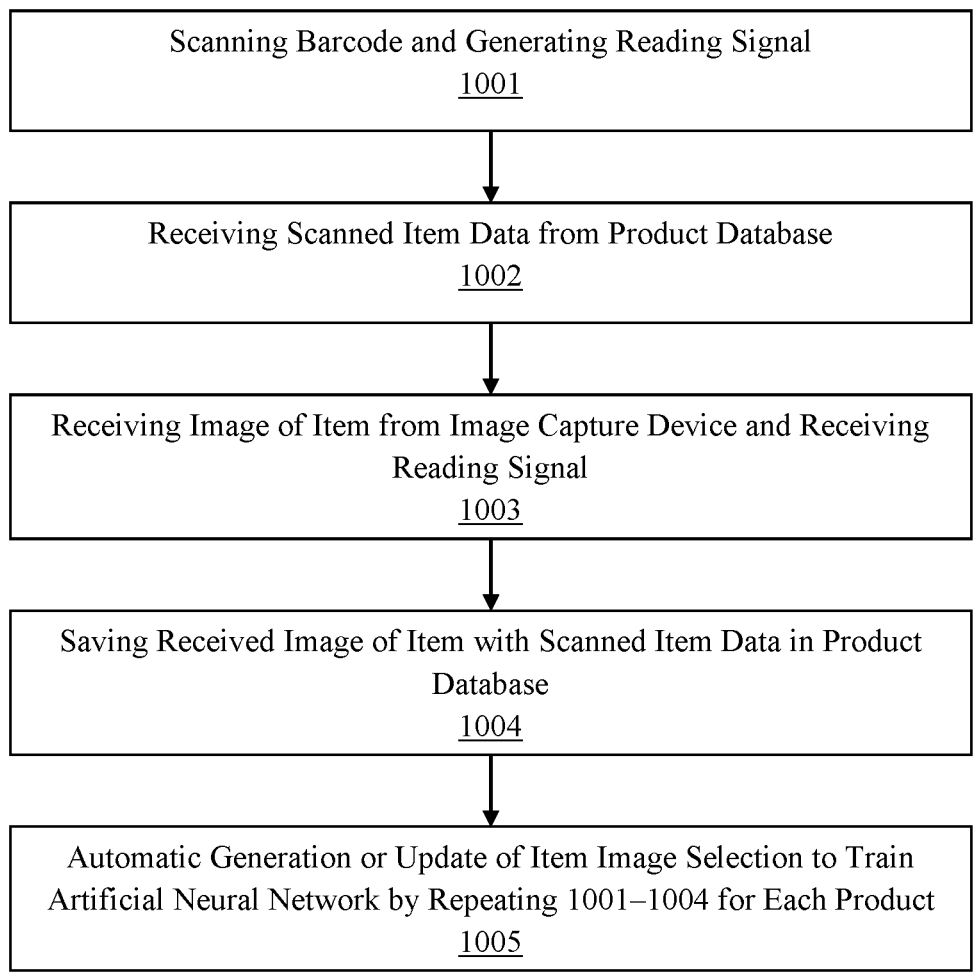
FIG. 3 is a flow chart of a method of automatic selection of product images to teach an artificial neural network.

FIG. 3 shows a flow chart of one embodiment of the method of automatic generation of product image set for teaching an artificial neural network.

This method is implemented using a POS system disclosed above with at least one data processing module. The method contains the following stages:

(1001) once a cashier places an item against the barcode reader, a barcode is scanned, and a barcode data signal is generated, as described above;

(1002) the data about the scanned product is obtained from the products database stored in POS system memory based on the barcode data signal received by the data processing module;

If this product database does not contain the information about the scanned product, then this product database automatically generates a new entry about a new product.

(1003) Once the data processing module receives the barcode data signal, this module receives the image of the placed item from the image capture device configured to receive the video data from the barcode scanning area.

(1004) The data processing module stores the received image of the placed item with the data about the scanned product in the product database.

The received image is stored even when the scanned product data already contains at least one image. Also, a user can set a threshold N for the number of images for each product.

For example, a user sets N to 10. Once the barcode data signal is received, the data processing module receives the data about the scanned product and analyzes the received data. If the number of the images in the image set for the scanned product equals ten, then the data processing module deletes the oldest image and stores the new just received image of the product into the set. Thus, the information about the products is updated all the time. This is necessary, because the appearance of the products changes with time, and there is no need to store old images of the products.

The user may also set a product price threshold. In this case, once the barcode data signal is received, the data processing module receives the data about the scanned product and analyzes the received data. If the price of the product is lower than the preset threshold (for example, less than $100), then the image received at the moment of scanning the item from the image capture device is not added to the product images.

(1005) The stages 1001-1004 are repeated for each item placed against the barcode reader, thereby the product image set is automatically generated or updated to teach the artificial neural network used for verification to detect cashier fraud.

In the disclosed solutions, the artificial neural network may learn from the updated product database.

The product image selection generation or update and artificial neural network learning are continuous processes, because the set of relevant products and their appearance change with time. A user of the POS system may set a specific time when the artificial neural network is taught. For example, once a day or once a week. And the learning may be done by, for example, the data processing module of the POS system, or by the POS system cloud service, or by any other computational device.

The data processing module may generate or update the product image set, teach the artificial neural network, and detect cashier fraud in parallel.

In some embodiment, where all products in the product database are divided into product classes, each product class has its own artificial neural network. Large stores may have an artificial neural network even for each product. As has been described above, the artificial neural networks are used for product verification, thus, the greater the number of artificial neural networks, the more accurate the verification result is, and the more exact and error-free cashier fraud detection is, because each artificial neural network is specifically designed for one particular product or a class of products.

The embodiments of the present group of inventions may be implemented by software, hardware, programmable logic devices, or their combination. In the example embodiments, the programmable logic devices, software, or a set of instructions are stored on one or more different traditional computer-readable data media.

In this description, a computer-readable data medium may be any medium or device which can store, contain, transfer, distribute, or transport instructions (commands) for their use (execution) by a computation device, for example, a computer, wherein the data medium could be a transitory or non-transitory computer-read data medium.

At least some of different operations described in this solution may be performed in a different order and/or in parallel.

Although this technical solution has been described in detail to illustrate the most relevant and preferable embodiments, this invention is not limited to the disclosed embodiments, and it is designed for further modification and various combinations of features different from the described embodiments. For example, the present invention permits that one or more features of any embodiments could be combined, if possible, with other one or more features of other embodiments.

The invention claimed is:

1. A POS system for detecting fraud comprising:
a barcode reader configured to send a barcode data signal;
a memory module configured to store a product database with product images corresponding to products;
an image capture device configured to receive video data from a cashier barcode scanned area; and
a data processing module configured to:
receive data related to a first product from the product database corresponding to the barcode data signal from the barcode reader and receive data related to at least a second product from the product database corresponding to the barcode data signal from the barcode reader;
receive video data from the image capture device;
verify using an artificial neural network, wherein the verification comprises:
comparing a first product image received from the image capture device at the moment of receiving a barcode data signal with at least one product image received from the product database corresponding to the first product corresponding to the barcode data and comparing at least a second product image received from the image capture device at the moment of receiving a barcode data signal with at least one product image received from the product database corresponding to the second product corresponding to the barcode data;
updating the artificial neural network with the second product image; and
comparing image descriptors of each scanned item and of the images for the scanned product barcode using Euclidean distance, wherein if the Euclidean distance is less than a pre-set value, then the data processing module determines using the artificial neural network that the image of the scanned product matches the image from the product database and if the Euclidean distance exceeds the pre-set value then the data processing module continues to compare the image descriptors of the scanned item and of other product images in the product database; and
detect fraud when the verification result is negative,
wherein data about each product comprises a product price; and
wherein if the product price of the product is less than pre-set threshold, then the product is not verified.

2. The system of claim 1, wherein the data processing module is additionally configured for automatic generating or updating the product image selection for artificial neural network learning, and this selection contains sets of product images.

3. The system of claim 1, wherein the products in the product database are divided into the product classes.

4. The system of claim 3, wherein each product or each class of products has its own artificial neural network used for verification.

5. The system of claim 1, wherein data about each product includes the name of the product, its value, its barcode, a selection of product images.

6. The system of claim 5, wherein the verification runs in a real time mode.

7. The system of claim 6, wherein the detection of cashier fraud requires sending a notification of a pre-set particular user.

8. The system of claim 5, wherein verification runs through archived data obtained from the barcode reader and the image capture device stored in the memory.

9. The system of claim 8, wherein archive data verification automatically generates a report with all detected facts of a cashier fraud.

10. A method of detecting cashier fraud embodied by a POS system comprising at least one data processing module, wherein the method contains the stages:
placing a first product against a barcode reader by a cashier to read a barcode, and developing a first barcode data signal; and
placing a second product against the barcode reader by the cashier, and developing a second barcode data signal;
wherein each barcode data signal gives the data about a corresponding scanned product from product database, wherein the product database contains constantly updated product images;
wherein video data from an image capture device is received and verified by an artificial neural network taught by the constantly updated product database and by video data of multiple products,
wherein the verification comprises:
comparing, in parallel for each barcode data signal giving the data about the corresponding scanned product from the product database, and product images received from the image capture device at the moment of receiving the barcode data signal;
comparing image descriptors of each scanned item and of the images for the scanned product barcode using Euclidean distance, wherein if the Euclidean distance is less than a pre-set value then the data processing module determines using the artificial neural network that the image of the scanned product matches the image from the product database and if the Euclidean distance exceeds the pre-set value then the data processing module continues to compare the image descriptors of the scanned item and of other product images in the product database;

if verification result is negative, then at least one data processing module detects cashier fraud, wherein data about each product comprises a product price; and wherein if the product price of the product is less than pre-set threshold, then the product is not verified.

11. The method of claim 10, further comprising selecting or updating the product images using the data processing module; and teaching an artificial neural network and detecting cashier fraud in parallel.

12. The method of claim 10, wherein the products in the product database are divided into the product classes.

13. The method of claim 12, wherein each product or a class of products has its own artificial neural network used to verification.

14. The method of claim 10, wherein the data about each product comprises a product name, a product barcode, or a product image.

15. The method of claim 14, wherein the product image selection contains N latest uploaded images for this product where N is a positive integer pre-set by a user.

16. The method of claim 10, wherein the verification runs in a real time mode.

17. The method of claim 16, wherein the detection of cashier fraud requires sending a notification of a pre-set particular user.

18. The method of claim 10, wherein verification runs through archived data obtained from the barcode reader and the image capture device stored in a memory.

19. The method of claim 18, wherein archive data verification automatically generates a report with all detected facts of a cashier fraud.

20. Non-transitory computer readable medium storing instructions that, when executed by a computer, cause it to perform the method of detecting cashier fraud of claim 10.

* * * * *